United States Patent Office 2,862,975
Patented Dec. 2, 1958

2,862,975

TREATMENT OF WOOD TAR DISTILLATE

John G. Gatsis, Chicago, Ill., assignor to Universal Oil Products Company, Des Plaines, Ill., a corporation of Delaware No Drawing. Application December 10, 1956
Serial No. 627,127

5 Claims. (Cl. 260—613)

This invention relates to the treatment of wood tar distillate to recover dialkyl ethers of 5-alkyl-pyrogallols therefrom.

The dialkyl ethers of 5-alkyl-pyrogallols have been found to be effective non-staining antiozonants for use in preventing the cracking of rubber due to ozone. Because these antiozonants do not impart color to the rubber, they are especially useful in white or light-colored rubber. They also are of especial utility in dark-colored rubber which is molded to or otherwise adjoins light-colored rubber in order that the antiozonant used in such dark-colored rubber does not transfuse into the light-colored rubber and impart color thereto. It is understood that the antiozonant also may be used in other dark-colored rubber when desired. The rubber may be of natural or synthetic origin.

The wood tar distillate containing the desired dialkyl ethers of 5-alkyl-pyrogallols are obtained by the distillation of hardwoods including hickory, oak, beech, walnut, etc. The distillate so obtained is a complex mixture of phenolic and non-phenolic compounds, including pyrogallol, 5-alkyl-pyrogallols, monomethyl ether of pyrogallol, monomethyl ethers of 5-alkyl-pyrogallols, dimethyl ethers of pyrogallol, dimethyl ethers of 5-alkyl-pyrogallols, alkylated guaiacols, neutral oils, etc. The separation of the dialkyl ethers of 5-alkyl-pyrogallols is a difficult problem, and the present invention is directed to a novel method for effecting this separation.

In one embodiment the present invention relates to a method of separating the dialkyl ethers of 5-alkyl-pyrogallols from wood tar distillate which comprises treating said wood tar distillate with an excess of monoethanolamine to form a precipitate comprising the ethanolamine salts of the dialkyl ethers of 5-alkyl-pyrogallols, and separately recovering said salts.

The wood tar distillate generally is first settled in order to separate a settled tar oil from soluble oil. This settling may be effected at ambient temperature but in many cases preferably is effected at an elevated temperature, which may range up to about 100° C. The settling at elevated temperature also effects removal of volatile components from the wood tar distillate.

While the settled wood tar distillate may be treated in accordance with the present invention and subsequently fractionated to separate the desired selected fraction, in a preferred embodiment the settled wood tar distillate is first fractionated, preferably under subatmospheric pressure to avoid destructive reactions during fractionation, to separate a selected fraction, and the selected fraction then is subjected to treatment in the manner herein set forth. In one embodiment the selected fraction has a nominal boiling range of from about 240° to about 320° C. and in another embodiment it has a nominal boiling range of from about 270° to about 310° C. It is understood that the selected fraction may have any other suitable boiling range as desired.

In accordance with the present invention, the settled wood tar distillate and preferably a selected fraction thereof is subjected to treatment with an excess of monoethanolamine. Monoethanolamine appears to be unique for this use in that the salts thereof formed with the dialkyl ethers of 5-alkyl-pyrogallols are solid at room temperature, whereas the salts of other organic amino compounds investigated were liquid at room temperature and, therefore, could not be readily separated from the other components of the wood tar distillate.

As hereinbefore set forth, an excess of monoethanolamine is utilized. This excess is over and above the stoichiometric amount required to form the ethanolamine salts of all phenolic compounds contained in the wood tar distillates being treated. The ethanolamine salts of these phenolic compounds are formed but only the ethanolamine salts of the dialkyl ethers of 5-alkyl-pyrogallols precipitate out of solution, while the ethanolamine salts of the other phenolic compounds are soluble in the excess ethanolamine solution. On a weight basis of the usual commercial wood tar distillate fraction, the amount of monoethanolamine to be employed may range from 0.25 to 2 parts or more by weight of monoethanolamine per one part by weight of wood tar distillate. The exact proportion will depend upon the phenolic content of the particular wood tar distillate being treated. Because the monoethanolamine subsequently is recovered for reuse in the process, the use of a larger excess of monoethanolamine over and above that actually required is not too objectionable from an economical viewpoint. Therefore, in general, it is preferred that a larger excess be employed and, in such cases, may range from about one to two parts or more by weight of monoethanolamine per one part by weight of wood tar distillate.

The monoethanolamine is incorporated in the wood tar distillate in any suitable manner and at ambient or elevated temperature which generally will range from about 60° to about 100° C. In some cases, when these are mixed at ambient temperature, the mixture sets into a jelly-like mass. This mixture then is heated to about 60° C. or more and, upon cooling, the ethanolamine salts of the dialkyl ethers of 5-alkyl-pyrogallols settle as a solid precipitate and the other components remain in the liquid phase. The ethanolamine salts of the dialkyl ethers of 5-alkyl-pyrogallol may be separated from the liquid in any suitable manner including, filtration, decanting the supernatant liquid, centrifugal separation, etc.

When desired, the mixing of the ethanolamine and wood tar distillate may be effected in the presence of a solvent at ambient or elevated temperature, the latter generally being above about 60° and below about 100° C. Any suitable solvent may be employed and preferably comprises a paraffinic hydrocarbon including pentane, hexane, heptane, octane, etc., or mixtures thereof. In some cases, other organic solvents may be employed including ethers, higher alcohols, etc. When the mixing is effected at a temperature below about 60° C., a separate hydrocarbon phase is formed. This phase contains the neutral oils, which are non-phenolic compounds, and forms as an upper phase which may be decanted or otherwise separated from the remaining components of the mixture. The remaining components are separated in the manner described in the previous paragraph by heating to about 60° C. or more and then cooling to form a solid precipitate, which is removed in the manner previously described.

In another embodiment of the invention, the mixing in the presence of a solvent is effected at a temperature above about 60° C., which temperature generally will not exceed about 100° C. In this embodiment of the invention, two liquid layers are formed. The upper or hydrocarbon layer will contain the neutral oil and the dissolved ethanolamine salts of the 2,6-dialkyl ethers of 5-alkyl-pyrogallols. In this embodiment the two liquid phases are separated in any suitable manner, and the desired salts then are separated from the hydrocarbon phase by cooling and separation in any suitable manner as hereinbefore set forth.

After separation of the ethanolamine salts of the dialkyl ethers of 5-alkyl-pyrogallols, the remaining components should be treated to recover the ethanolamine, and this may be accomplished by distillation to remove the ethanolamine as an overhead fraction. The remaining components then may be utilized in the manner recovered or, after further treatment, for any suitable purpose including, for example, as an anti-oxidant in gasoline, fuel oil, grease, etc.

The ethanolamine salts of the dialkyl ethers of 5-alkyl-pyrogallols, after separation from the other components of the wood tar distillate, are treated to recover the dialkyl ethers of 5-alkyl-pyrogallol and to recover monoethanolamine for further use in the process. This separation may be effected in any suitable manner including hydrolysis, neutralization with acid, distillation, etc. In general, hydrolysis is preferred and is readily effected by mixing with water. In order to expedite hydrolysis, the mixture preferably is heated to an elevated temperature which may range from about 35° to about 100° C. The hydrolyzed salts separate into a dialkyl ether phase and an aqueous phase, and each phase is separately withdrawn from the settling zone. In another embodiment, the salts may be sprung by neutralization with an acid, and any suitable acid may be employed including hydrochloric acid, sulfuric acid, acetic acid, propionic acid, butyric acid, etc., as well as hydrogen sulfide, carbon dioxide, etc. The monoethanolamine may be recovered from the neutralized product in any suitable manner and reused in the process. In still another embodiment the separation is effected by distillation, in which case a particular solvent is required. The solvent must have a boiling point higher than ethanolamine but lower than the dialkyl ethers of 5-alkyl-pyrogallols. A particularly preferred solvent is decalin. In this embodiment, the ethanolamine and decalin are removed in the overhead fraction and then are subsequently separated by settling or in any other suitable manner.

After separation of the dialkyl ether fraction, it may be subjected to such further treatment as desired in order to insure removal of undesired components. When the wood tar has not been fractionated previously, fractionation of the product will include recovery of a selected fraction which will have the correct physical and chemical properties for use as a non-staining antiozonant in rubber.

As hereinbefore set forth, the dialkyl ethers of 5-alkyl-pyrogallols are the effective non-staining antiozonant compounds. The dimethyl ethers which appear to predominate in wood tar distillate include the dimethyl ethers of 5-methyl-pyrogallol, 5-ethyl-pyrogallol and of 5-n-propyl-pyrogallol. It is understood that other dialkyl ethers of 5-alykyl-pyrogallols which are present in the wood tar distillate will be recovered by the novel process of the present invention and these may include one or more of the following: dimethyl ethers of 5-alkyl-pyrogallol, 5-n-butyl-pyrogallol, 5-isobutyl-pyrogallol, 5-n-amyl-pyrogallol, etc., as well as the diethyl ethers and possibly the dipropyl ethers of 5-alkyl-pyrogallols. The antiozonant recovered by the present invention is utilized in rubber in a concentration of from about 0.25 to about 10% by weight and preferably of from about 2% to about 5% by weight of the rubber hydrocarbon. The antiozonant is utilizable along with other additives incorporated in rubber for specific purposes including, for example, antioxidants, accelerators, softeners, extenders, wax, reinforcing agents, etc.

The following examples are introduced to illustrate further the novelty and utility of the present invention but not with the intention of unduly limiting the same.

*Example I*

A commercial settled wood tar distillate was subjected to fractionation to separate a selected fraction having a nominal boiling range of from about 270° to about 310° C. 200 grams of the selected fraction was intimately commingled with 400 grams of monoethanol amine. The mixture was heated to about 60° C. and extracted with a heptane fraction at 60° C. and then allowed to cool to ambient temperature. The crystals formed on cooling comprised the insoluble ethanolamine salts of dialkyl ethers of 5-alkyl-pyrogallols and the crystals then were subjected to hydrolysis by addition of water and heating to 60° C. 48 grams of product were obtained which contained less than 1% by weight of dihydroxy compounds. The 48 grams recovered amounts to 24% by weight of the wood tar distillate charged, and comprises approximately quantitative recovery of the dialkyl ethers of 5-alkyl-pyrogallols present in the wood tar distillate charge.

*Example II*

The wood tar distillate used in this example is a commercial settled wood tar distillate which had been fractionated to separate a selected fraction having a nominal boiling range of from about 240° to about 320° C. 210 grams of the selected fraction of wood tar distillate was commingled with 70 grams of monoethanolamine and one liter of pentane. The pentane-soluble material was separately removed, and the pentane-insoluble material was heated to 60° C., cooled and then separated by filtration into a solid precipitate and a liquid filtrate. The solid precipitate comprised the ethanolamine salts of 5-alkyl-pyrogallols and amounted to 44 grams. It was analyzed and found to contain 21.6 grams of the dimethoxy ethers of 5-alkyl-pyrogallols, 1.4 grams of the monomethoxy ethers and 7.2 grams of monoethanolamine. After hydrolysis and further treatment, this fraction is of the desired physical and chemical properties for use as a non-staining antiozonant to prevent cracking of rubber due to ozone.

*Example III*

A commercial settled wood tar distillate is fractionated to separate a selected fraction having a nominal boiling range of from about 240° to about 320° C. 210 grams of the selected fraction of wood tar distillate is commingled with 70 grams of monoethanolamine and the mixture heated to 60° C. and allowed to cool to ambient temperature. The precipitate formed is separated from the liquid by filtering, and the precipitate comprising the ethanolamine salts of the dialkyl ethers of 5-alkyl-pyrogallols is neutralized to recover the dialkyl ethers of 5-alkyl-pyrogallols, which are used as an antiozonant in rubber.

*Example IV*

As hereinbefore set forth, monoethanolamine appears to be unique in the formation of solid salts of the dialkyl ethers of 5-alkyl-pyrogallols. The following organic amino compounds were investigated and none of these formed a salt which is solid at room temperature. These other organic amino compounds are diethyl amine, pyrrolidine and aniline. Diethanolamine reacted with the wood tar distillate to form a thin paste, which is difficult to separate from the other components of the wood tar distillate. Thus, it appears that monoethanolamine is unique for use in accordance with the present invention.

I claim as my invention:

1. A method of concentrating the dialkyl ethers of 5-alkyl-pyrogallols present in wood tar distillate which comprises treating said wood tar distillate with an excess of monoethanolamine to form a precipitate comprising the ethanolamine salts of the dialkyl ethers of 5-alkyl-pyrogallols, separating the precipitate, and treating the same to recover a concentrate of said dialkyl ethers of 5-alkyl-pyrogallols.

2. A method of concentrating the dialkyl ethers of 5-alkyl-pyrogallols present in wood tar distillate which comprises treating said wood tar distillate with an excess of monoethanolamine to form a precipitate comprising the ethanolamine salts of the dialkyl ethers of 5-alkyl-pyrogallols, separating the precipitate, and hydrolyzing the same to recover a concentrate of said dialkyl ethers of 5-alkyl-pyrogallols.

3. A method of concentrating the dialkyl ethers of 5-alkyl-pyrogallols present in wood tar distillate which comprises treating said wood tar distillate with an excess of monoethanolamine to form a precipitate comprising the ethanolamine salts of the dialkyl ethers of 5-alkyl-pyrogallols, separating the precipitate, and neutralizing the same to recover a concentrate of said dialkyl ethers of 5-alkyl-pyrogallols.

4. A method of concentrating dimethyl ethers of 5-alkyl-pyrogallols present in settled wood tar distillate boiling within the range of from about 240° to about 320° C. which comprises treating said wood tar distillate with an excess of monoethanolamine to form a precipitate comprising the ethanolamine salts of the dialkyl ethers of 5-alkyl-pyrogallols, separating the precipitate, and hydrolyzing the same to recover a concentrate of said dimethyl ethers of 5-alkyl-pyrogallols.

5. A method of concentrating dimethyl ethers of 5-alkyl-pyrogallols present in settled wood tar distillates boiling within the range of from about 270° to about 310° C. which comprises treating said wood tar distillate with an excess of monoethanolamine to form a precipitate comprising the ethanolamine salts of the dialkyl ethers of 5-alkyl-pyrogallols, separating the precipitate and hydrolyzing the same to recover a concentrate of said dimethyl ethers of 5-alkyl-pyrogallols.

References Cited in the file of this patent

UNITED STATES PATENTS

| | | |
|---|---|---|
| 2,313,385 | Levesque | Mar. 9, 1943 |
| 2,482,594 | Pearl et al. | Sept. 20, 1949 |
| 2,507,649 | Rosenwald | May 16, 1950 |

OTHER REFERENCES

Fisher et al.: Jour. Amer. Chem. Soc., vol. 63 (1941) pp. 1881–1883.